United States Patent [19]  [11] 4,379,806
Korpman  [45] Apr. 12, 1983

[54] PRESSURE-SENSITIVE ADHESIVE TAPE AND PROCESS

[75] Inventor: Ralf Korpman, Somerset County, N.J.

[73] Assignee: Johnson & Johnson, New Brunswick, N.J.

[21] Appl. No.: 353,676

[22] Filed: Mar. 1, 1982

Related U.S. Application Data

[63] Continuation of Ser. No. 54,539, Jul. 5, 1979, abandoned.

[51] Int. Cl.³ ............................. C09J 7/02; B28B 3/20
[52] U.S. Cl. ............................. 428/354; 156/244.11; 264/46.1; 264/171; 264/176 R; 428/352; 428/355; 428/420; 428/480; 428/521; 428/913

[58] Field of Search ............... 428/355, 343, 354, 352, 428/420, 480, 913, 521; 156/244.11; 264/46.1, 171, 176 R

[56] References Cited

U.S. PATENT DOCUMENTS

3,565,737  2/1971  Lefevre et al. ............... 264/171 X
3,783,072  1/1974  Korpman ..................... 156/244.11
3,882,219  5/1975  Wiley ............................. 264/171
3,984,509  10/1976  Hall et al. .............. 156/244.11 X

Primary Examiner—Thomas J. Herbert, Jr.
Attorney, Agent, or Firm—Alice O. Robertson

[57] ABSTRACT

Pressure-sensitive adhesive tapes with various backing films are prepared by a single step process of coextruding a backing film-forming composition and an adhesive composition. No primer is needed. Tapes with release properties are possible without additional preparative procedure.

9 Claims, 9 Drawing Figures

PRESSURE-SENSITIVE ADHESIVE TAPE AND PROCESS

This is a continuation of application Ser. No. 54,539, filed July 5, 1979, now abandoned.

The present invention relates to normally tacky pressure-sensitive adhesive film-backed tapes and more particularly to tacky film-backed tapes which range in use from surgical to industrial applications and to a process for their preparation.

BACKGROUND OF THE INVENTION

Normally tacky pressure-sensitive adhesive film-backed tapes usually comprise a non-tacky supporting film and an aggressively tacky adhesive layer on one major surface of the film. The expression "film-backed tape" or "film tape" refers to tapes in which the backing is of film as distinguished from paper or fabric backed tapes. The tape is usually prepared by a two-step process in which the adhesive is coated on a previously prepared film. The adhesives preferred for this purpose are called rubber-resin adhesives because they consist of a blend of natural or synthetic rubber and tackifier resin. While other resins and additives also may be included, the rubber and tackifier resin are the principal operative ingredients. Conventional rubber-resin adhesives of this type do not adhere satisfactorily to most films and particularly difficult anchorage problems have been encountered with polyolefin and plasticized vinyl film backings. Although the use of thermoplastic-elastomeric block copolymers in the rubber constituent has improved anchorage, special formulations are generally required, and even then high levels of anchorage may not be attainable with some films. This has necessitated the use of primers, materials capable of adhering well to both the backing and the adhesive, as an intermediate layer in order to assure a high level of anchorage of the adhesive to the backing. In addition, inasmuch as tapes are stored in rolls, the adhesive of the tape adheres to the back side of the tape, i.e., the side of the film or tape opposite to that bearing the adhesive, not infrequently adhering very firmly rendering the use of the tape difficult at best. Such undesired adhesion is avoided by use of an interliner or backsizing the film or tape on the back side in a separate backsizing step. Improved tapes of various backing films as well as a more efficient method of producing the tapes is highly desirable.

DESCRIPTION OF THE INVENTION

According to the present invention, pressure-sensitive adhesive films and tapes may be realized which are prepared by a single step process in which the film-forming composition for the backing film and adhesive composition for the adhesive layer are simultaneously extruded to form adhesive layered films in which the adhesive layer is uniform and coextensive with the backing layer and in which the adhesive may be securely retained on the backing without a primer, even when the backings are of polyolefins or plasticized vinyls to which anchoring of an adhesive layer is extremely difficult. In addition, pressure-sensitive adhesive tapes can be realized which have a release agent incorporated in the backing film, rendering unnecessary the coating of the back side of the tapes with a release agent. The pressure-sensitive film-backed tape of this invention comprises (a) an adhesive layer of a normally tacky extrudable elastomeric composition, preferably a mixture of a thermoplastic rubber and resin and (b) a backing layer of a normally non-tacky thermoplastic film, wherein the tape is characterized by having the adhesive layer joined coextensively to the backing layer through an intermediate interlocking layer formed by controlled penetration of components during coextrusion of the film-forming and the adhesive compositions. This intermediate interlocking layer provides resistance to the separation of the adhesive layer from the backing layer, eliminating the need for a primer. When a release agent is incorporated in the film-forming composition prior to extrusion the resulting backing film contains the release agent and the tape is suitable for storage without further treatment.

The pressure-sensitive adhesive film-backed tapes of this invention are produced in a single step process of laminar extrusion of a thermoplastic film-forming polymer composition and a thermoplastic rubber-resin adhesive composition in such a way that the film-forming polymer composition and the adhesive composition with or without release agent intermingle in a controlled penetration at the interface during the extrusion to form an interlocking layer between the thermoplastic backing layer and the adhesive layer. A method for the preparation of pressure-sensitive adhesive tapes by a single step coextrusion process constitutes an aspect of the present invention.

The adhesive compositions for the pressure-sensitive adhesive tapes are those comprising an elastomeric component and a tackifier resin component wherein the tackifier component is present in an amount of from about 20 to about 300 parts, preferably 50 to about 150 parts, per 100 parts by weight of the elastomeric component. Preferably, the elastomeric component consists primarily of at least one thermoplastic-elastomeric block copolymer. The tackifier resin component is preferably primary of solid tackifier resin or resins. Both components may have included other resins as hereinafter enumerated.

The thermoplastic-elastomeric block copolymers of the elastomeric component of the preferred adhesive compositions employed in this invention are those having a thermoplastic block conventionally designated as A blocks and rubbery blocks conventionally designated as B blocks. Suitable block copolymers are those having thermoplastic endblocks and rubbery midblocks and designated as A—B—A block copolymers. The expression "A—B—A" block copolymer is intended to embrace all variations of block copolymers with rubbery midblocks and thermoplastic endblocks. Thus, it is intended to embrace copolymers sometimes designated A—B—C block copolymer in which C is also a thermoplastic endblock but of a different polymer than A. It is also intended to embrace radial block copolymers which may be designated $(A—B)_n X$ wherein X is a polyfunctional atom or molecule and in which each (A—B)—radiates from X in a way that A is an endblock. A—B block copolymer, sometimes referred to as "simple" block copolymer in which B forms one endblock rather than a midblock may be included to modify the A—B—A block copolymers and the expression "block copolymer" without qualification is intended to embrace them as well.

The thermoplastic "A" block is generally a polymer of alkenylarenes, preferably of styrene or styrene homologs and analogs such as α-methylstyrene, 4-tertiary-butylstyrene, 4-methylstyrene, 3,5-diethylstyrene, 3,5-di-n-butylstyrene, 4-(4-phenyl-n-butyl)styrene, 2-ethyl- 4-benzylstyrene, 4-cyclohexylstyrene, 4-n-propylstyrene, 4-dodecylstyrene, vinyltoluene and the like.

The rubbery "B" block is a polymer of a conjugated aliphatic diene of from 4 to 6 carbon atoms or a lower alkene of from 2 to about 6 carbon atoms. Suitable conjugated dienes include butadiene, isoprene, 1,3-pentadiene, 1,3-hexadiene, 2,3-dimethylbutadiene and the like. The preferred dienes are butadiene and isoprene. Suitable alkenes include ethylene, butylene, propylene and the like. In the A—B block copolymers, the "B" blocks are preferably isoprene.

The block copolymers may be linear, branched or radial. A branched copolymer is essentially a linear polymer in which branching may occur randomly anywhere in the rubber copolymer chain. A radial block copolymer is characterized and distinguished from the branched linear copolymer in having blocks radiating from a central core as previously stated. In $(A—B)_n X$, X may be an organic or inorganic polyfunctional atom or molecule and n is an integer having the same value as the functional group originally present in X. It is usually at least 3 and is frequently 4 or 5 but is not limited thereto. In addition, it embraces a more complex radial system as disclosed in an article. "New Rubber is Backed by Stars," appearing in Chemical Week, June 11, 1975, page 35.

In the suitable block copolymers, the individual "A" block portion has a number average molecular weight of at least 6,000, preferably in the range of from about 8,000 to 30,000, and the "B" block portion has a number average molecular weight preferably in the range of from about 45,00 to about 180,000. The "A" blocks constitute from about 5 to about 50 percent, preferably about 10 to about 30 percent by weight of the block copolymer. The number average molecular weight of the block copolymer is preferably in the range of about 75,000 to 200,000 for linear copolymers and preferably in the range of about 125,000 to 400,000 for radial copolymers. In the A—B copolymers, the number average molecular weight of the A blocks should be about 7,000 to about 20,000, and the total molecular weight of the block copolymer generally should not exceed about 150,000.

Suitable thermoplastic-elastomeric block copolymers are prepared by stepwise solution polymerization of the components. The preparations and properties of block copolymers are amply described in the literature such as, for example. "Thermoplastic Rubber (A—B—A Block Copolymers) in Adhesives" by J. T. Harlan et al, in "Handbook of Adhesives" edited by Irving Skeist, Van Nostrand Reinhold Co., New York, Second Edition (1977), pages 304–330; "Rubber-Related Polymers, I. Thermoplastic Elastomers" by W. R. Hendricks et al, in "Rubber Technology" edited by Maurice Morton, Van Nostrand Reinhold Co., New York (1973), pages 515–533; and U.S. Pat. Nos. 3,519,585; 3,787,531; and 3,281,383; and for A—B block copolymers, U.S. Pat. Nos. 3,519,585 and 3,787,531.

When the "A" block is polystyrene and the "B" block is a polymer of butadiene in an A—B—A type block copolymer, the polymer is frequently referred to as a S—B—S polymer, and when the "A" block is a styrene polymer and the "B" block is an isoprene polymer, the polymer is frequently referred to as a S—I—S polymer. Many of the block copolymers are obtainable commercially and useful alone or, in blends such as, for example, Solprene ® 420 (radial S—I—S), 311 (simple S-I), 1205 (simple S-B), products of the Phillips Petroleum Company; Kraton ® 1102 (linear S—B—S) and 1107 (linear S—I—S), products of the Shell Chemical Company.

The elastomer component may include more conventional non-block elastomers. The latter, if employed, must be in a low plasticity state and should not exceed about 50 percent by weight of the total elastomeric component. By "low plasticity state" is meant a Mooney viscosity number of less than 50, preferably less than 35. These more conventional elastomers may include highly broken down natural rubbers, butadiene-styrene random copolymer rubbers, synthetic, polyisoprene, chloroprene rubbers, nitrile rubbers, butyl rubbers and the like. Potentially elastomeric liquid polymers also may be employed as additives but in lower proportions. Further, the elastomer component may be other than a block copolymer although less preferred. Thus, for example, the process is adaptable to the preparation of pressure-sensitive adhesive tapes in which the elastomer component is ethylene vinyl acetate.

The adhesive compositions may also include some amounts of other materials such as antioxidants, stabilizers, ultraviolet light absorbers, fillers, and the like. Typical antioxidants are 2,5-ditertiary amylhydroquinone diteriary butyl cresol. Conventional heat stabilizers such as zinc salts of dialkyl dithiocarbamates may also be included. If desired, small amounts of fillers and pigments such as zinc oxide, aluminum hydrates, clay, calcium carbonate, titanium dioxide, carbon black, and the like may be added.

The tackifier resin component of the preferred adhesive compositions employed in this invention comprises a major amount of a tackifier resin and may contain a minor amount, i.e., 0 to less than 50 percent by weight of other resins compatible with the elastomeric component. Conventional tackifier resins include hydrocarbon resins, rosin, hydrogenated rosin, rosin esters, polyterpene resins, and other resins which exhibit the proper balance of properties in the "quickstick," adhesion and cohesion strength tests as described in the chapter on "Pressure-Sensitive Tapes and Labels" by C. W. Bemmels, in "Handbook of Adhesives" edited by Irving Skeist, Van Nostrand Reinhold Company, (1977), pages 724–735. Other resins which may be employed in minor amounts in the tackifier resin component of the adhesive composition include polymers and copolymers of α-methylstyrene, vinyltoluene and similar aromatic monomers containing from about 8–12 carbon atoms, polymers of coumarone and indene and related cyclic compounds, and other resins providing internal strength to the overall composition.

The thermoplastic film-forming composition of the backing film may be chosen from a wide variety of thermoplastic film-forming polymer compositions including compositions comprising polyethylene, polypropylene, polystyrene, polyvinylchloride, ethylene vinyl acetate polymer, copolyester, thermoplastic rubber block copolymer, and the like. The backing film may be elastomeric or non-elastomeric. Certain preferred compositions are hereinafter discussed.

One preferred type of film-forming composition for an elastic backing film is a thermoplastic-elastomeric block copolymer composition providing an elastomeric backing film in which the block copolymers correspond to the block copolymers as detailed in the definition of elastomeric component of the adhesive compositions previously described. Film-forming compositions based on block copolymers may and preferably do include significant amounts of low molecular weight resin which tend to associate principally with the thermoplastic A-block of the block copolymer. Typically, such resins are polymers of α-methylstyrene, styrene, vinyltoluene and similar aromatic monomers; also suitable are coumarone-indene resins and related resins from cyclic compounds. These resins preferably have a number average molecular weight not above about 3,000 and may be employed in an amount of from 0 to 200 parts for each 100 parts of the block copolymer. A-block associating resins of molecular weight greater than 3,000 may be included but these, if employed, should be in amounts less than the amounts of the resin of molecular weight lower than 3,000; usually these should not exceed 100 parts per 100 parts of block copolymer.

Another suitable type of film forming composition for an elastic backing film is one comprising a novel alloy of from about 85 to about 50 parts by weight of an A—B—A or A—B block copolymer and correspondingly from about 15 to 50 parts by weight of a copolyester. The A—B—A block copolymers correspond generally to the A—B—A block copolymers previously detailed. The copolyesters are polycondensation products of a dicarboxylic acid and an aliphatic diol wherein the copolyester is characterized by having at least two different ester units joined in a random or segmented manner. The copolyesters in the novel alloys include, for example, copolyesters of ethylene terephthalate and ethylene isophthalate; butylene terephthalate and butylene isophthalate; ethylene terephthalate and ethylene azelate; ethylene terephthalate and ethylene sebacate; ethylene terephthalate and butylene adipate; ethylene terephthalate and 1,2-propylene terephthalate, etc. The copolyesters in the novel alloy compositions normally possess a thermal softening temperature below about 225° C. (437° F.) and exhibit torque value below 1,000 meter-grams, preferably about 200 to about 700 meter-grams in the recording torque dynamometer under conditions previously described. Novel alloy compositions suitable for forming backing films are more fully described and claimed in copending application "Novel Alloy Compositions and Products," Ser. No. 54,540, July 5, 1979, in the name of Ralf Korpman, filed concurrently herewith.

Film forming compositions for non elastic backing film are preferably polyethylene, polyproplene and plasticized vinyl chloride. These compositions are available commercially and may be used without modification or may be modified as well known by the skilled in the art.

In the foregoing compositions, for a backing film, the compositions also may be modified with minor amounts of conventional modifiers such as antioxidants, e.g., 2,5-diteriary-amylhydroquinone, zinc salts of alkyl diethiocarbamate; fillers and/or pigments, e.g., zinc oxide, titanium dioxide, calcium carbonate, etc.

In accordance with this invention, a film backed pressure-sensitive adhesive tape is formed by coextruding a thermoplastic backing film-forming polymer composition and an adhesive composition in such a way that the film-forming composition and the adhesive composition coextensively physically intermingle at the interface in a controlled interpenetration to produce an intermediate interlocking layer which mechanically engages the backing layer and the adhesive layer in the direction perpendicular to the principal plane of the tape or film in a laminar relationship. By "coextruding" as herein employed is meant producing substantially simultaneously incipient separate films of a backing layer and of an adhesive layer by charging separate hoppers of an extrusion apparatus with a backing film-forming polymer composition and a rubber resin adhesive composition.

It is critical and essential in the successful practice of the process of the present invention to obtain the novel product of the present invention that the thermoplastic film-forming composition and the adhesive composition exhibit certain characterizing properties. A suitable property is torque value, conveniently measured and read in meter-grams by working in a recording torque dynamometer (Plasti-Corder® EPL-V750, manufactured by C. W. Brabender Co., Hackensack, N.J.). When worked at 75 r.p.m. at 420° F. using a REE 6 mixing head, both film and adhesive compositions must have torque values of greater than about 100 meter-grams and less than about 1,000 meter-grams. The preferred range is from about 200 to about 700 meter-grams at 420° F. These values may be converted to poises by employing the following formula $$\frac{\text{torque} \times 388}{\text{r.p.m.}} = \text{poise}$$

Thus, when expressed in poises, the respective compositions should show torque related properties of less than about 5200 poises, preferably about 1000 to 3600 poises. A wide variety of thermoplastic film-forming compositions and adhesive compositions may be employed provided that, at least the foregoing property is fulfilled. It is to be noted that a particular film-forming polymer or particular adhesive elastomer may not alone exhibit the foregoing property but may be blended with a second polymer or elastomer to provide suitable film-forming or adhesive compositions.

In addition to the foregoing, it is preferred that the backing film composition and the adhesive composition have similar melting point range in the plastified state so that they may be brought together either inside an extrusion die and extruded as a laminate through a single slot die, or in a combining manifold or adapter where the plasticized compositions intermingle along the interface forming an interlocking layer and the adhesive laminated film so joined extruded through a single die orifice. However, differences in the melting point and viscoelastic characteristics of the backing film and adhesive compositions may dictate that the compositions be brought into separate manifolds with parallel die slots so that the plastified backing film and the plastified adhesive film emerge separately but are then immediately drawn or pressed together while still plastified to form the adhesive laminated film of the present invention.

For extrusion at full width in a single slot die without a combining manifold, the temperature differential between the adhesive composition and the backing film composition may be as great as 30° C. When the extrusion is carried out using the combining adapter or manifold with a single slot die, the film forming composition may be at a temperature at about 10° to 20° C. higher or lower than that of the plastified adhesive composition at the time of combination. When a dual slot die is employed, the temperature differential may be as great as about 50° C. When the adhesive composition is of a rubber-resin for the production of the preferred tape products of the present invention, the melting temperatures of the adhesive compositions are in the range of from about 160° C. to about 220° C., preferably in the range of from about 190° C. to about 210° C. Thus, it is preferred that for full width single slot die extrusion that the backing film composition have a melt temperature of not above about 300° C. preferably not above about 220° C.; for single slot die extrusion from a combining adapter, a temperature of not above about 210° C., preferably not above about 200° C.; and, for dual slot die extrusion, a temperature not above about 270° C. preferably not above about 240° C.

An embodiment of this invention is a pressure-sensitive adhesive tape wherein the backing film or the adhesive layer contains a release agent. This is especially useful when the backing film is of a polymer such as a copolyester or a thermoplastic elastomer which does not have inherent release characteristics and would require the separate step of coating the backside of the film with a release agent. For tapes having such characteristics, the adhesive composition or the backing film composition may be modified by incorporation of a release agent. When the release agent is to be put into the backing film, known materials may be employed provided they are employed in the absence of solvent. Most suitable are waxes, synthetic or natural, and copolymers of stearyl methacrylate and acrylonitrile such as those described in U.S. Pat. No. 3,502,497. These materials may be added in the dry state to the film-forming composition in an amount of about 2 to 5 parts or as much as 10 parts by weight. When the release agent is to be added to the adhesive composition, one of the suitable currently available release agent is lecithin. Lecithin may be incorporated in the adhesive composition in an amount of about 0.5 to about 5 percent, preferably about 0.5 to about 2 percent.

In carrying out this embodiment the release agent is added in the dry form to either the adhesive composition or the film-forming composition, and the adhesive and film-forming compositions coextruded to produce the film or tape wherein the film-forming polymer and the adhesive are coextensively mechanically engaged in an interlocking intermediate layer. Because of this mechanical engagement in the interlocking layer, the attachment of the adhesive to the backing film is not adversely affected by the release agent. In this embodiment, the tape can be wound upon itself in roll form with the adhesive layer facing inwardly toward the axis of the roll and it can be unwound readily from the uncoated backing without adversely affecting the anchorage between the adhesive and the backing film. As a result of these properties, not only is there eliminated the need for a primer layer between the adhesive and backing film but there is eliminated also the need for a separate step of coating a release agent on the outside (on the side opposite to that bearing the adhesive) of the backing film.

BRIEF DESCRIPTION OF THE DRAWINGS

Features of the invention may be seen further in the accompanying drawing wherein.

Figure 1:
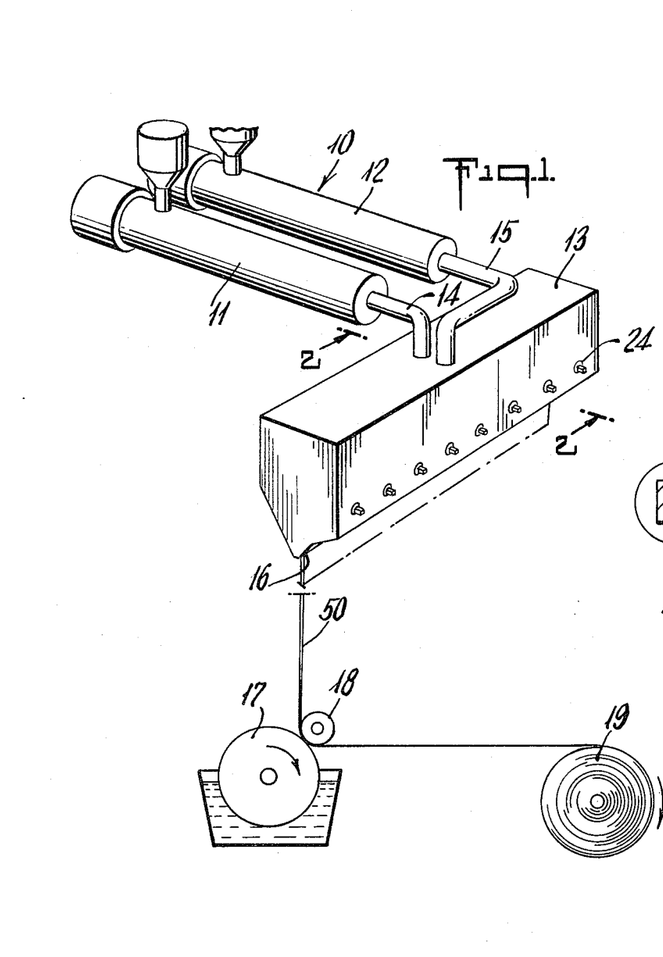
FIG. 1 is a perspective view of a representative coextrusion apparatus with a flat die.

According to the present invention, a pressure-sensitive adhesive tape may be prepared by coextrusion employing an apparatus as depicted in FIG. 1. The coextrusion apparatus generally designated by reference numeral 10 has a cooperative combination a first extruder 11, a second extruder 12 and a flat die 13 receiving extrudate from both extruders. Extruder 11 is in operative combination with die 13 by means of conduit 14. Extruder 12 is in operative communication with die 13 by means of conduit 15. Die 13 has an elongated extrusion orifice 16. An adhesive laminated film 50 is shown issuing from die orifice 16 and passing between cooling rollers 17 and 18 and rolled into windup roll 19.

The extruder to be employed may be any conventional extruder. Thus, both first and second extruders may be single screw extruders. The extruder for the adhesive composition may be a modified single screw extruder in which blocking means are positioned between flights of the screw to mechanically displace the composition to prevent sticking to the screw as disclosed in U.S. Pat. No. 3,984,509.

In operation, a backing film forming composition is placed in first extruder 11, adapted to be heated to plastify the film-forming material and the adhesive composition is placed in second extruder 12, adapted to be heated to plastify the adhesive material. The heat plastified materials formed in extruders 11 and 12 are passed through respective conduits 14 and 15 into die 13 from which there is coextruded through orifice 16 an adhesive laminated film 50 in which the film and the adhesive are interlocked in an intermediate layer by a mechanical bond formed by the intermingling of the two components at the interface. The issuing film is drawn from the die, passing through cooling rollers 17 and 18 and wound on windup roll 19.

Figures 2, 3, 4, 5:
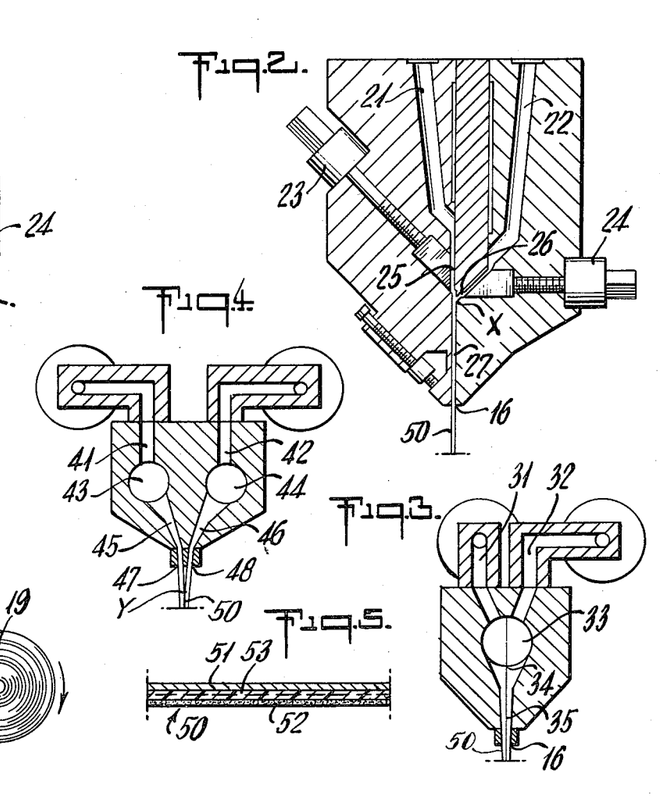
FIG. 2 is a cross-sectional view taken along line 2—2 of FIG. 1 showing a single slot flat die.
FIG. 3 depicts an alternative embodiment showing a combining manifold and a single slot flat die.
FIG. 4 depicts still another embodiment showing a dual manifold and dual slot flat die.
FIG. 5 is a sectional view along the plane of the film or tape produced by coextrusion.

FIG. 2 is a cross-sectional representation of a view of die 13 of FIG. 1, taken along line 2—2 where the conduits 14 and 15 of FIG. 1 passes into the die body. Conduits 14 and 15 are in operative communication with passageways 21 and 22 in the die body. The die is provided with means 23 and 24 for adjusting the size of the passageway at 25 and 26 for desired backing film and adhesive thickness. The plasticized materials passing through 25 and 26 join at X and proceed through a single passageway 27 and are coextruded through orifice 16 as adhesive laminated film 50.

FIG. 3 is a cross-sectional representation of another embodiment of a die suitable for the preparation of an adhesive laminated film by coextrusion. In this modification, conduits 14 and 15 are operably connected through passageways 31 and 32 in the die to a combining manifold 33 in the die body where plasticized thermoplastic component and plasticized adhesive component intermingle along interface 34 forming an interlocking layer along the interface and the adhesive laminated film 50 so joined in an interlocked layer is extruded through the orifice 16.

FIG. 4 is a cross-sectional representation of still another embodiment of a die suitable for the preparation of an adhesive laminated film 50 by coextrusion. In this modification, the conduits 14 and 15 are in operable communication through passageways 41 and 42 with manifolds 43 and 44 which are operably connected through passageways 45 and 46 with parallel slots 47 and 48 corresponding to the orifice 16 of the extrusion die of FIG. 2. In this modification, the thermoplastic backing film and adhesive film emerge from the die separately but are immediately joined at Y while still in the plastic state to form an adhesive laminated film 50 in which the adhesive and the thermoplastic film form an intermediate interlocked layer.

The film is drawn from the die and conveyor to cooling rollers and thereafter to windup roll or slit into desired width for use as tape according to conventional procedures.

FIG. 5 is a cross-sectional view of the film 50 prepared by coextrusion showing the thermoplastic film layer 51, the interlocking layer 53 and the adhesive layer 52. The interlocking layer 53 which is a mechanical mixture of the thermoplastic compound of film layer 51 and adhesive component of adhesive layer 52, and which is formed from the components while in the molten state provides the necessary adhesion of two dissimilar polymers.

The coextrusion process of the present invention is adaptable to blown film extrusion methods as well. Such method may be carried out employing a blown film extrusion die 60 such as that shown in FIG. 6 which is a cross-sectional view of a representative side fed annular die 61 and schematically showing an emerging laminated blown film 62, collapsing frame 63 and collapsed film 64.

Figures 6, 7, 8, 9:
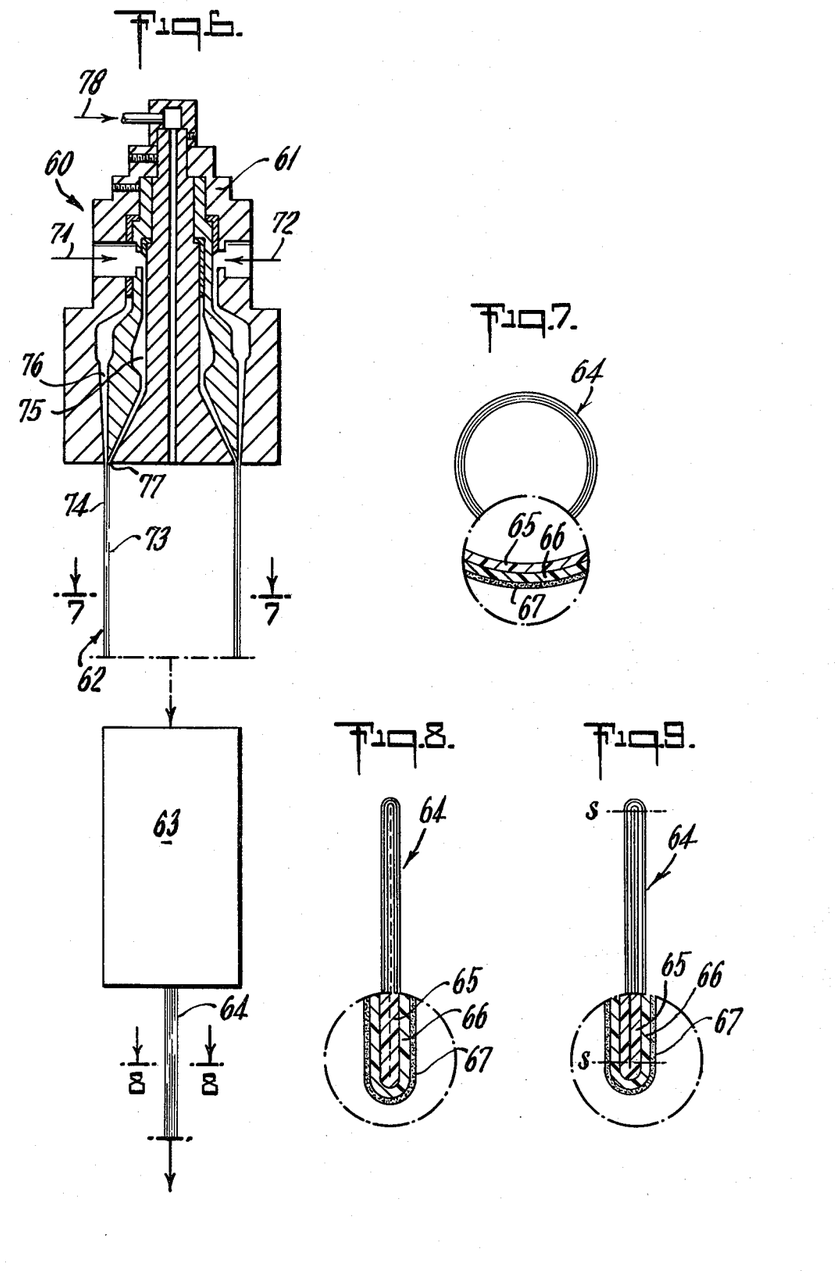
FIG. 6 is a cross-sectional view of an apparatus suitable for use in tubular coextrusion using an annular die.
FIG. 7 is a view taken along 7—7 in FIG. 6 with a portion enlarged showing a cross-section of the extruded tubular film.
FIG. 8 is a cross-sectional view taken along 8—8 in FIG. 6 with a portion enlarged showing the cross-section of the tubular film after having passed through compressing rolls to form a double-faced adhesive tape.
FIG. 9 is a view of an extruded tubular film collapsed and ready for slitting to form two flat films.

In FIG. 6, conduit 71 carries the thermoplastic film-forming composition which forms the inner layer 73 of the blown film while conduit 72 carries the adhesive composition which forms the outer layer 74 of the blown film. Conduit 71 is in operable communication with an annular passageway 75 while conduit 72 is in operable communication with annular passageway 76. During the extrusion, the thermoplastic layer passing through annular passageway 75 emerges at orifice 77 forming the inner layer 73 and the adhesive layer passing through annular passageway 76 emerges forming outer layer 74 and the emerging laminated film is blown by air entering through conduit 78 forming laminated blown film 62. The annular shape of the layered film is seen in FIG. 7. As shown in the enlarged portion, there is the inner thermoplastic film backing layer 65, the outer adhesive layer 67 and the intermediate interlocking layer 66. The blown layered film 62 is led through a collapsing frame 63 which collapses the film bubble as seen in FIG. 9 or is led through a heated collapsing frame to join permanently the two backing films resulting in a film having adhesive on both outer surfaces as seen in FIG. 8. FIG. 8 which represents a cross-section through 8—8 in FIG. 6 shows the compressed double faced adhesive film and the enlarged end shows the outer adhesive layer 67, the inner thermoplastic backing layer 65 and the intermediate interlocking layer 66.

The blown film fie assembly may be employed to produce the same film 50 as produced by the flat film die 13. This may be accomplished by collapsing the bubble and thereafter passing the collapsed and cooled film through a slitter to provide two sheets of adhesive laminated films. For preparation of the film by this method, a release agent is added to the film composition prior to extrusion.

The flat film so produced may be seen in FIG. 9 showing in cross-section the collapsed film in which the inner surface 65 are not joined permanently and which may be slit along lines s and wound on two mandrels to provide two rolls of pressure-sensitive film.

The films prepared by this procedure may be slit into tapes employing conventional procedures.

The following examples illustrate representative thermoplastic backing film-forming compositions and adhesive compositions suitable for coextrusion to produce the adhesive laminated film suitable for pressure-sensitive tapes in accordance with the present invention and the appropriate extruder temperature for the representative films and like films. It is to be understood that the examples are given for purposes of illustration only and that the invention is not to be regarded as to the specific materials or conditions used in the specific embodiments. It will be readily apparent to those skilled in the art that innumerable variations, applications, modifications and extensions of the basic principles involved may be made without departing from its spirit or scope.

EXAMPLE I

| Copolyester Film | |
|---|---|
| Film Forming Composition | |
| Poly(ethylene terephthalate, co-ethylene azelate), (number av. m.w. ~21,000) | |
| Extruder temperatures: | |
| feed end of screw | 140–150° C. |
| front end of screw | 155–165° C. |
| head | 165–175° C. |
| die | 170–190° C. |
| Adhesive Composition | Parts by Weight |
| S—I—S block copolymer, (number av. m.w. ~125,000) | 100 |
| Tackifier resin (Wingtack® 95)* | 80 |
| Zinc dibutyl dithiocarbamate (heat stabilizer) | 2 |
| 2,5-Di-tertiary-amyl-hydroquinone (antioxidant) | 0.5 |
| Extruder temperatures: | |
| feed end of screw | 140–150° C. |
| front end of screw | 155–165° C. |
| head | 165–175° C. |
| die | 170–190° C. |

*Solid tackifier resin predominantly of polymerized piperylene and isoprene, product of Goodyear Tire & Rubber Co.

EXAMPLE II

| Thermoplastic Rubber Film | |
|---|---|
| Film Forming Composition | Parts by Weight |
| S—I—S block copolymer, 15% styrene (number av. m.w. ~125,000) | 100 |
| Poly-α-methylstyrene, softening pt. 290° F. | 100 |
| Zinc dibutyl dithiocarbamate | 2 |
| 2,5-Di-tertiary-amylhydroquinone | 0.5 |
| Extruder temperatures: | |
| feed end of screw | 140–150° C. |
| front end of screw | 155–165° C. |
| head | 165–175° C. |

-continued

| Thermoplastic Rubber Film | |
|---|---|
| die | 170–190° C. |

| Adhesive Composition | Parts by Weight |
|---|---|
| S—I—S block copolymer, 15% styrene (number av. m.w. ~125,000) | 75 |
| S—I block copolymer, 17% styrene (number av. m.w. ~110,000) | 25 |
| Tackifier resin (Wingtack® 95) | 80 |
| Zinc dibutyl dithiocarbamate | 2 |
| 2,5-Di-tertiary-amylhydroquinone | 0.5 |
| Extruder temperatures: | |
| feed end of screw | 140–150° C. |
| front end of screw | 155–165° C. |
| head | 165–175° C. |
| die | 170–190° C. |

EXAMPLE III

| Plasticized Vinyl Film | |
|---|---|
| Film Forming Composition | Parts by Weight |
| Polyvinyl chloride resin (medium high m.w., av. sp. visc. 0.48) | 100 |
| Polymeric glycol ester plasticizer | 35 |
| Epoxy soya oil | 5 |
| Dibutyl tin maleate | 2 |
| CaCO₃ filler | 10 |
| Stearic acid | 0.5 |
| Extruder temperatures: | |
| feed end of screw | 120–140° C. |
| front end of screw | 140–160° C. |
| head | 150–170° C. |
| die | 160–180° C. |

| Adhesive Composition | Parts by Weight |
|---|---|
| S—I—S block copolymer (number av. m.w. ~125,000) | 25 |
| S—I block copolymer, 17% styrene (number av. m.w. ~110,000) | 75 |
| Tackifier resin (Wingtack® 95) | 90 |
| Zinc dibutyl dithiocarbamate | 2 |
| 2,5-Di-tertiary-amylhydroquinone | 0.5 |
| Extruder temperatures: | |
| feed end of screw | 120–140° C. |
| front end of screw | 140–160° C. |
| head | 150–170° C. |
| die | 160–180° C. |

EXAMPLE IV

| Polyethylene Film | |
|---|---|
| Film Forming Composition | |
| Low Density polyethylene (density 0.910–0.935) | |
| Extruder temperatures: | |
| feed end of screw | 190° C. |
| front end of screw | 230° C. |
| head | 230° C. |
| die | 230° C. |

| Adhesive Composition | Parts by Weight |
|---|---|
| S—I—S block copolymer, (number av. m.w. 125,000) | 100 |
| Tackifier resin (Wingtack® 95) | 60 |
| Coumarone-indene (solid tackifier) | 30 |

| Polyethylene Film | |
|---|---|
| softening pt. 145° C.) | |
| Zinc dibutyl dithiocarbamate | 2 |
| 2,5-Di-tertiary-amylhydroquinone | 0.5 |
| Extruder temperatures: | |
| feed end of screw | 140–150° C. |
| front end of screw | 155–165° C. |
| head | 165–175° C. |
| die | 170–200° C. |

EXAMPLE V

| Polypropylene Film | |
|---|---|
| Film Forming Composition | |
| Polypropylene (extrusion grade) | |
| Extruder temperatures: | |
| feed end of screw | 210° C. |
| front end of screw | 270° C. |
| head | 270° C. |
| die | 270° C. |

| Adhesive Composition | Parts by Weight |
|---|---|
| S—I—S block copolymer (number av. m.w. 125,000) | 75 |
| S—B—S block copolymer (number av. m.w. 125,000) | 25 |
| Tackifier resin (Wingtack® 76) | 80 |
| Zinc dibutyl dithiocarbamate | 2 |
| 2,5-Di-tertiary-amylhydroquinone | 0.5 |
| Extruder temperatures: | |
| feed end of screw | 140–150° C. |
| front end of screw | 155–165° C. |
| head | 190° C. |
| die | 220° C. |

EXAMPLE VI

| Copolyester Film | |
|---|---|
| Film Forming Composition | Parts by Weight |
| Poly(ethylene terephthalate Co-ethylene azelate) (number av. m.w. ~21,000) | 45 |
| Poly(butylene terephthalate, co-butylene isophthalate (number av. m.w. ~16,000) | 45 |
| Polyethylene silver pigment concentrate | 10 |
| Stearyl methacrylate-acrylonitrile copolymer release agent (U.S. Pat. No. 3,502,497, Example III polymer used in spray dried form) | 5 |
| Extruder temperatures: | |
| feed end of screw | 140–150° C. |
| front end of screw | 155–165° C. |
| head | 165–175° C. |
| die | 170–190° C. |

| Adhesive Composition | Parts by Weight |
|---|---|
| S—I—S block copolymer (number av. m.w. ~125,000) | 100 |
| Tackifier resin (Wingtack® 95) | 80 |
| Zinc dibutyl dithiocarbamate (heat stabilizer) | 2 |
| 2,5-Di-tertiary amylhydroquinone (antioxidant) | 0.5 |
| Extruder temperatures: | |
| feed end of screw | 140–150° C. |
| front end of screw | 155–165° C. |

-continued

| Copolyester Film | |
|---|---|
| head | 165–175° C. |
| die | 170–190° C. |

EXAMPLE VII

| Thermoplastic Rubber Polyethylene Film | |
|---|---|
| Film Forming Composition | Parts by Weight |
| S—I—S block copolymer, 15% styrene (number av. m.w. ~125,000) | 100 |
| Low density polyethylene, (density 0.910–0.935) | 100 |
| Acrawax ® C (synthetic wax, m.p. 142–144° C., product of Glyco Chemicals) | 10 |
| Extruder temperatures: | |
| feed end of screw | 190° C. |
| front end of screw | 230° C. |
| head | 230° C. |
| die | 230° C. |
| Adhesive Composition | |
| S—I—S block copolymer, 15% styrene (number av. m.w. ~125,000) | 75 |
| S—I block copolymer, 17% styrene (number av. m.w. ~110,000) | 25 |
| Tackifier resin (Wingtack ® 95) | 80 |
| Zinc dibutyl dithiocarbamate | 2 |
| 215-Di-tertiary-amylhydroquinone | 0.5 |
| Extruder temperatures | |
| feed end of screw | 140–150° C. |
| front end of screw | 155–165° C. |
| head | 165–175° C. |
| die | 170–190° C. |

EXAMPLE VIII

| Thermoplastic Copolyester-Rubber Film | |
|---|---|
| Film Forming Composition | Parts by Weight |
| S—I—S block copolymer, 15% styrene (number av. m.w. ~125,000) | 25 |
| Poly(ethylene terephthalate, co-ethylene azelate) (number av. m.w. ~21,000) | 75 |
| Extruder temperatures: | |
| feed end of screw | 140–150° C. |
| front end of screw | 155–165° C. |
| head | 165–175° C. |
| die | 170–190° C. |
| Adhesive Composition | |
| S—I—S block copolymer (number av. m.w. ~125,000) | 100 |
| Tackifier resin Wingtack ® 95 | 60 |
| Tackifier resin Cumar ® 509LX | 30 |
| Zinc dibutyl dithiocarbamate | 2 |
| 2,5-Di-tertiary-amylhydroquinone | 0.5 |
| Extruder temperatures: | |
| feed end of screw | 140–150° C. |
| front end of screw | 155–165° C. |
| head | 190° C. |
| die | 220° C. |

EXAMPLE IX

| Polyethylene Film | |
|---|---|
| Film Forming Composition | |
| Low density polyethylene (density 0.910–0.935) | |
| Extruder temperatures: | |
| feed end of screw | 190° C. |
| front end of screw | 230° C. |
| head | 230° C. |
| die | 230° C. |
| Adhesive Composition | Parts by Weight |
| Ethylene vinyl acetate Copolymer | 100 |
| Foral 105 (pentaerythritol ester of highly stabilized rosin, solid tackifier, softening paint, 94° C., Hercules Chem. Co.) | 80 |
| Staybelite Ester No. 3 (glycerol ester of hydrogenated rosin, liquid tackifier, softening point ~10° C., Hercules Chem. Co.) | 20 |
| Zinc dibutyl dithiocarbamate (antioxidant) | 2 |
| 2,5-Diteriary-amylhydroquinone (antioxidant) | 0.5 |
| Extruder temperatures: | |
| feed end of screw | |
| front end of screw | |
| head | |
| die | |

What is claimed is:

1. A pressure-sensitive adhesive tape comprising
   (a) an adhesive layer of a normally tacky thermoplastic pressure-sensitive rubber-resin and
   (b) a backing layer of a normally non-tacky thermoplastic film,
   wherein said adhesive layer is joined substantially coextensively to said backing layer through an intermediate interlocking layer containing both components in a laminar relationship formed by coextruding an adhesive composition and a thermoplastic film-forming composition, each having a torque value of between about 100 meter grams and 1000 meter grams when worked at 75 r.p.m. at 420° F. in a Brabender torque dynamometer,
   wherein said adhesive composition comprises (i) an elastomeric component and (ii) a tackifier resin component in which the tackifier resin component is present in an amount of from about 20 to 300 parts for each 100 parts by weight of the elastomeric component, and
   wherein the elastomeric component of the adhesive composition comprises a block copolymer selected from the group consisting of A—B—A block copolymer, A—B block copolymer and mixtures thereof.

2. A pressure-sensitive adhesive tape according to claim 1 wherein the thermoplastic film-forming composition of the backing layer comprises an A—B—A block copolymer or a mixture thereof with an A—B block copolymer.

3. A pressure-sensitive adhesive tape according to claim 1 wherein the thermoplastic film-forming composition of the backing layer comprising a polymer alloy of an A—B—A block copolymer and a copolyester.

4. A pressure-sensitive adhesive tape according to claim 1 wherein the thermoplastic film-forming composition of the backing layer comprises polyethylene.

5. A pressure-sensitive adhesive tape according to claim 1 wherein the thermoplastic film-forming composition of the backing layer comprises polypropylene.

6. A pressure-sensitive adhesive tape according to claim 1 wherein the thermoplastic film-forming composition of the backing layer comprises plasticized vinyl chloride.

7. A pressure-sensitive adhesive tape according to claim 1 wherein the thermoplastic film-forming composition of the backing layer comprises a copolyester.

8. A pressure-sensitive adhesive tape according to claim 1 wherein the adhesive layer contains a release agent.

9. A pressure-sensitive adhesive tape according to claim 1 wherein the backing layer contains a release agent.

* * * * *